US010083175B2

(12) United States Patent
Alexander et al.

(10) Patent No.: US 10,083,175 B2
(45) Date of Patent: Sep. 25, 2018

(54) GRAPHICAL USER INTERFACE FOR TRACKING DATA ACCESS AND DATA CHANGES IN A CENTRALIZED DATABASE

(71) Applicants: Candice R. Alexander, East Hartford, CT (US); Jonathan M. Schantz, Southwick, MA (US)

(72) Inventors: Candice R. Alexander, East Hartford, CT (US); Jonathan M. Schantz, Southwick, MA (US)

(73) Assignee: Hartford Fire Insurance Company, Hartford, CT (US)

( * ) Notice: Subject to any disclaimer, the term of this patent is extended or adjusted under 35 U.S.C. 154(b) by 516 days.

(21) Appl. No.: 14/829,155

(22) Filed: Aug. 18, 2015

(65) Prior Publication Data
US 2017/0052952 A1    Feb. 23, 2017

(51) Int. Cl.
*G06Q 50/18* (2012.01)
*G06F 17/30* (2006.01)
*G06F 3/0481* (2013.01)
*G06F 3/0484* (2013.01)
*G06Q 10/10* (2012.01)
*G06F 17/22* (2006.01)
*G06F 17/27* (2006.01)

(52) U.S. Cl.
CPC .... *G06F 17/30011* (2013.01); *G06F 3/04817* (2013.01); *G06F 3/04847* (2013.01); *G06F 17/2229* (2013.01); *G06F 17/2288* (2013.01); *G06F 17/2735* (2013.01); *G06Q 10/10* (2013.01)

(58) Field of Classification Search
CPC ....................................................... G06Q 50/18
See application file for complete search history.

(56) References Cited

U.S. PATENT DOCUMENTS

| 6,526,398 | B2* | 2/2003 | Wolff ................. G06F 17/3061 |
| | | | 707/688 |
| 6,934,715 | B2 | 8/2005 | Kalmes et al. |
| 8,037,004 | B2 | 10/2011 | Rajkumar et al. |
| 8,781,815 | B1 | 7/2014 | Gidney |
| 2002/0194014 | A1* | 12/2002 | Starnes ................. G06Q 30/02 |
| | | | 705/4 |
| 2003/0204421 | A1 | 10/2003 | Houle et al. |

(Continued)

*Primary Examiner* — Justin S Lee
(74) *Attorney, Agent, or Firm* — Ference & Associates LLC

(57) ABSTRACT

Embodiments provide a system having a graphical user interface for tracking data access and data changes in a centralized database, including: a database storing a first language module; a display providing a graphical user interface that permits access to an authorized user for modifying the first language module; the graphical user interface including an icon for indicating a gap for the first module; a processor that, responsive to user interaction with the icon, opens in the graphical user interface, an at least one data field for indicating gap origin and at least one gap requirement; the graphical user interface providing a function for associating the gap with the first module; and a processor that stores in the database the first module, the gap, and a modified module based on the gap; the graphical user interface providing a search function to an authorized user for retrieving one or more of the first module and the modified module.

20 Claims, 14 Drawing Sheets

(56) References Cited

U.S. PATENT DOCUMENTS

| | | | |
|---|---|---|---|
| 2004/0143464 A1 | 7/2004 | Houle et al. | |
| 2004/0177326 A1* | 9/2004 | Bibko | G06Q 10/10 |
| | | | 715/200 |
| 2008/0046265 A1 | 2/2008 | Lee et al. | |
| 2008/0306894 A1 | 12/2008 | Rajkumar et al. | |
| 2009/0281853 A1* | 11/2009 | Misvaer | G06Q 10/06 |
| | | | 705/311 |
| 2011/0040697 A1* | 2/2011 | Constantinou | G06Q 10/06 |
| | | | 705/348 |
| 2011/0208662 A1* | 8/2011 | Haunschild | G06Q 10/10 |
| | | | 705/317 |
| 2013/0013996 A1* | 1/2013 | Wu | G06F 17/30011 |
| | | | 715/227 |
| 2013/0325516 A1* | 12/2013 | Bheemanakatte | G06Q 10/10 |
| | | | 705/4 |
| 2014/0379591 A1* | 12/2014 | Benner | G06O 50/18 |
| | | | 705/311 |
| 2016/0203494 A1* | 7/2016 | Galligan Davila | G06Q 30/018 |
| | | | 705/317 |

\* cited by examiner

FIG. 4

| Filing Search | Drafting Details | Filing Language | Gap Log | Related Filing Documents | Contract language | System Administration |

Document
☐ Check/Uncheck All
☐ Certificate
☑ POI

Section
☑ Check/Uncheck All
☑ Face Page

Module
☑ Check/Uncheck All
☑ Form GBD-2400 N/A - Face Page - Face Page

☑ Add    ☐ Gaps for Filing Only    ☑ Send Checked Gaps to QA    ☑ Checked Gaps QA Completed    ☒ Checked Gaps Objected To    ☐ Release Checked Gaps To BA(s)

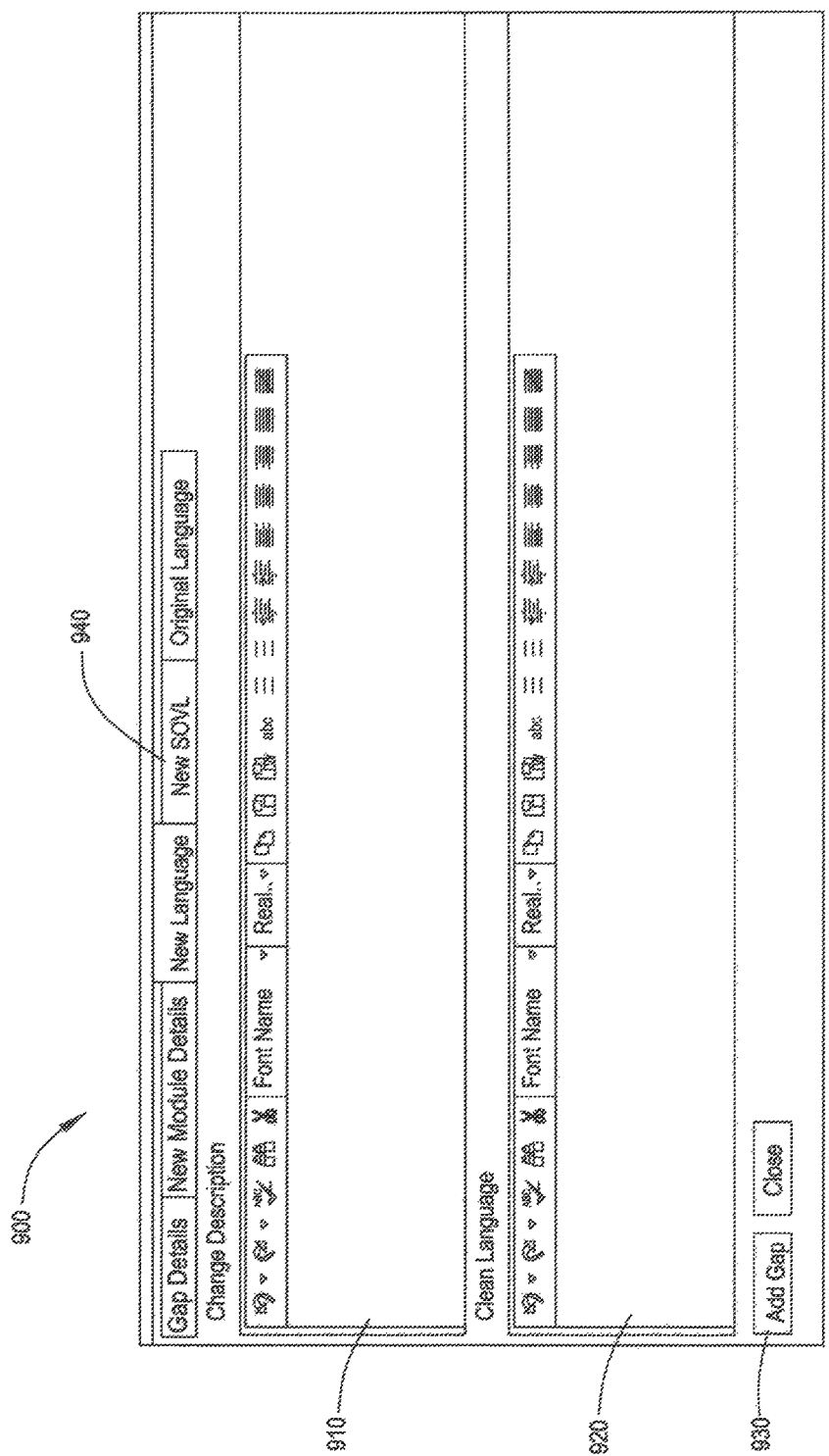

GRAPHICAL USER INTERFACE FOR TRACKING DATA ACCESS AND DATA CHANGES IN A CENTRALIZED DATABASE

BACKGROUND

Large corporations, for example national insurance providers, recreate certain documents (e.g., contracts, policy information, invoice requests, etc.) repeatedly during the course of normal business. Generally, these documents are created using language that is specific to the current implementation. For example, states have varying laws regarding business practices within their jurisdiction, thus contract language can vary greatly based on the law of the state where the contract is formed.

Therefore, large corporations, especially those operating across multiple states or countries are subject to an overwhelming amount of governmental regulations. These regulations are typically extremely specific, difficult to comprehend, and vary in minute but significant ways from jurisdiction to jurisdiction. Thus, it can be difficult for an entity, even a large corporation, to manage the overwhelming amount of jurisdictional specific information as well as ensuring they are utilizing the current regulations.

In addition to the variability based on jurisdiction, the language used to create these documents is put through a rigorous vetting process that ensures they are accurate and complete in nature. This process may involve many iterations and revisions of the language and may involve different individuals (e.g., drafter, legal counsel, state regulator, etc.). Because of the vastness of the information, and the frequency with which the information may be updated from different sources keeping all of the information centralized is of vital importance.

BRIEF SUMMARY

In summary, an embodiment provides a system having a graphical user interface for tracking data access and data changes in a centralized database, comprising: a database storing a first language module; a display providing a graphical user interface that permits access to an authorized user for modifying the first language module; the graphical user interface including an icon for indicating a gap for the first module; a processor that, responsive to user interaction with the icon, opens in the graphical user interface, at least one data field for indicating gap origin and at least one gap requirement; the graphical user interface providing a function for associating the gap with the first module; and a processor that stores in the database the first module, the gap, and a modified module based on the gap; the graphical user interface providing a search function to an authorized user for retrieving one or more of the first module and the modified module.

An additional embodiment provides a system having a graphical user interface for tracking data access and data changes in a centralized database, comprising: a database storing a first language module; a display providing a graphical user interface that permits access to an authorized user for modifying the first language module, wherein the authorization of the user has a plurality of access levels, the levels granting different amounts of access to the database; the graphical user interface including an icon for indicating a gap for the first module, wherein the gap is determined based on the laws and regulations of specific jurisdictions; a processor that, responsive to user interaction with the icon, opens in the graphical user interface, at least one data field for indicating gap origin and at least one gap requirement; the graphical user interface providing a function for associating the gap with the first module; and a processor that stores in the database the first module, the gap, and a modified module based on the gap; the graphical user interface providing a search function to an authorized user for retrieving one or more of the first module and the modified module.

A further embodiment provides a computerized method for using a graphical user interface for tracking data access and data changes in a centralized database, comprising: storing, in a database, a first language module; providing, on a display device, a graphical user interface that permits access to an authorized user for modifying the first language module; the graphical user interface including an icon for indicating a gap for the first module; opening, responsive to user interaction with the icon, the graphical user interface, at least one data field for indicating gap origin and at least one gap requirement; the graphical user interface providing a function for associating the gap with the first module; and storing, in a database, the first module, the gap, and a modified module based on the gap; the graphical user interface providing a search function to an authorized user for retrieving one or more of the first module and the modified module.

Additional embodiments are described, including other methods, as well as devices/apparatuses, systems including multiple devices, and products.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4 illustrates an example of selecting a desired module.

FIG. 5B illustrates another example of modification selection.

FIG. 7 illustrates an example of the module that will be created.

FIG. 8 illustrates an example of the module in its original state.

FIG. 9 illustrates another example of module modification.

FIG. 10A illustrates an example of a search query function.

FIG. 10B illustrates another example of a search query function.

DETAILED DESCRIPTION

Figure 1:
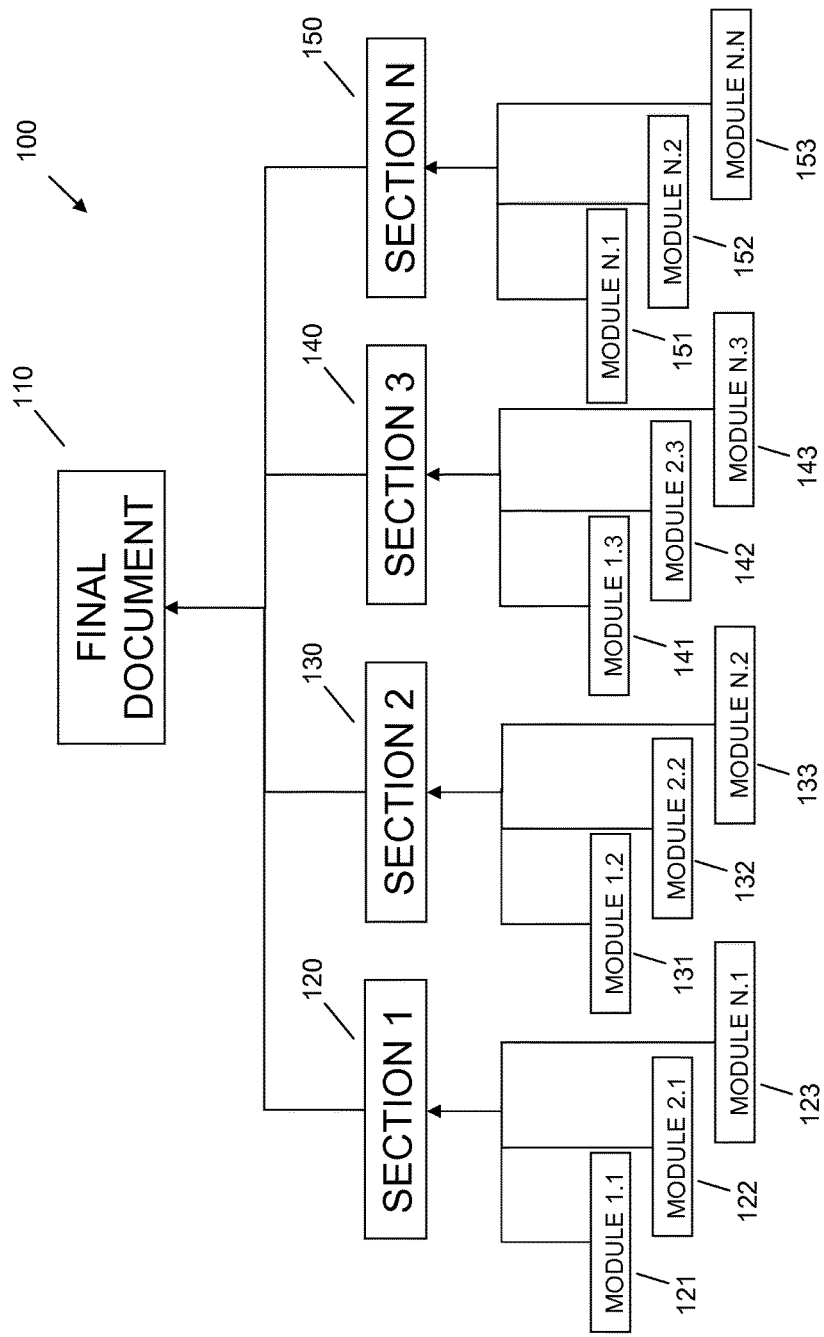
FIG. 1 illustrates an example of the formation of a final document through the use of modules and sections.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

An embodiment addresses the issues of large scale information collection and maintenance. As will become more apparent in the description of example embodiments, the discussed technological improvements offered by the various embodiments are applicable to a large variety of companies that use or maintain a large quantity of documentation that may be required to be reproduced while also accommodating small variations in the documentation, e.g., Fortune 500 companies, across all vertical segments.

Although various example embodiments are described with a focus on insurance enterprise applications, e.g., insurance filings and contracts, the principles and technological improvements offered may likewise be applied to various applications, e.g., of transportation companies, manufacturing companies, etc. Thus, embodiments permit enterprises, particularly large enterprises, to improve the creation and lifecycle management of information modules (e.g., paragraphs, sentences, phrases, verbiage, etc.). Embodiments may also be applied in contexts other than reproduced legal documents for large corporations (e.g., form letters for advertising purposes, newsletter distribution, article creation, etc.).

As mentioned, it is typical for corporations to recreate certain documents during the course of regular business. Because of the variation in these documents, the total number and scope of these documents can become difficult to manage. Thus, a system is needed to manage these variations (e.g., jurisdiction based modules) and allow for ease in searching (e.g., by keyword, module number, module name, etc.) and tracking. Not only can there be a broad range of repetitive information, but the information may need minor or large modifications in order to meet the needs of a particular issue. Traditionally, insurance companies have drafted these types of insurance contract documents with conditional logic (e.g., if/then statements) to generate contract language that complies with the insurance regulations of each of the states where the contract may be issued.

However, this method is inefficient and overly burdensome, and the use of conditional logic in legal documents can create future issues and make it difficult to amend or revise particular sections of the document without causing a cascading affect and negatively impacting other portions of the document thereby causing unintended consequences. This is particularly a problem regarding insurance contract documents, which could contain conditional logic across hundreds of sections. Thus, a change to a single section could cause a chain effect creating issues throughout the remainder of the document. This can be a particular problem when a jurisdiction updates or modifies their regulations and standards. Thus, a solution is needed to manage and track the components/modules of a contract.

Additionally, because legal documents can be extremely large and may require changes to individual sections based on the intended jurisdiction (e.g., states often require that an insurance policy contract form be filed with and approved by the state's insurance department), they need to be broken down into a system of modules. These modules may be recombined to create whole documents. This allows for a granular system of document creation, where an end user can select the relevant and approved portions of a document and combine them to form the final required document. Therefore, a system is needed that can maintain not only a single module in a variety of iterations (e.g., a disability insurance policy for each state based on that state's laws), but many modules in varying iterations that may later be combined to form various documents.

Moreover, the creation of the documents from conception of the generic form to the final stage may consist of multiple iterations of multiple modules and needs to be tracked and monitored. This process of approval and modification likely involves many different individuals in different roles who each only require a particular type of access (e.g., an administrator, legal department, sales department, IT department, etc.). Thus, an embodiment provides a solution that cannot only manage the large number of individual modules, but also their revision and modification history. Because of the vastness of the information, and the fact that the information may be updated from difference sources (e.g., different employees at a company) the centralization and maintenance of the data is critical.

In order to address the above discussed issues, an embodiment utilizes a web based repository that assists product delivery with managing filings, approved language, objections, and gaps. Each of these categories contains their own issues and complexities, which creates technical issues regarding the management and implementation required to keep them all organized in a complete and continuous fashion. An embodiment also provides the business area (e.g., operations, sales, distribution, underwriting, product, compliance, etc.) with approved language variability by product in the context of a document.

An embodiment needs to improve the overall process discussed herein, enhance reporting and analysis and allow quick access/reference of the most recent approved or changed modules. Thus, an embodiment provides a clear articulation of state requirements in the context of legal documents (e.g., contract, filing, etc.); houses all the modules in each iteration type (e.g., state specific and generic);

identifies and updates the understanding of variability allowed in the fillable documents.

Embodiments represent a significant technical improvement to the lifecycle management of language modules through an enhanced graphical user interface (GUI) implementation. An embodiment is directed to substantially more than merely a computer implementation of a routine or conventional activity previously known in the industry as it significantly advances the technical efficiency, access and/or accuracy of creating, maintaining, tracking, and storing jurisdictional specific language modules by implementing a specific new method and system as defined herein.

An embodiment provides a specific advancement in the area of language modules management for large companies (e.g., a large insurance company), by providing technical benefits for module creation, module variability, module lifecycle, and module implementation and such advances are not merely a longstanding commercial practice. The embodiments provide improvement beyond a mere generic computer implementation as they involve the processing and conversion of significant amounts of data in a new beneficial manner as well as the interaction of a variety of specialized insurance, client and/or vendor systems, networks and sub-systems.

For example, an embodiment facilitates the efficient management of a centralized and intuitive module repository. By managing and tracking language modules from conception to final approval the embodiment fills an immediate and longstanding need for large corporations. In addition, the repository allows for gaps to be identified by a particular individual or application. The gapping process (e.g., modifying a generic language module to accommodate a particular jurisdiction) is also managed and tracked in a sophisticated and efficient manner. For example, different individuals are involved at different states of the process; however the work process is smooth and fluid during each phase of the transition.

This fluidity is attained because an embodiment stores all the information in a centralized database. Thus there is no need for multiple iterations of the module, and no way for confusion regarding which module is the most current or if a certain module is approved. In addition, an embodiment manages each user's access level. Certain users will have greater access than others. This eliminates the possibility that a user could modify a portion of the modules, section, or document that they are not qualified or approved to modify. This reduces accidents and mistakes caused by user error.

The illustrated example embodiments will be best understood by reference to the figures. The following description is intended only by way of example, and simply illustrates certain example embodiments.

Referring to FIG. 1, illustrates how modules may be stored in a web-based repository for managing modules/components of a contract. The general concept of document creation through the use of modules is shown at 100. Typically, a final document (e.g., an insurance contract) at 110 will follow a certain pattern of formation even across multiple jurisdictions. For example, the introduction and explanation portions of the document may be very similar in each state because they contain little substantive law regarding the jurisdiction. This allows for the creation of sections at 120-150 relevant to the required needs of the document. The illustrated example shows that a document may contain multiple sections up to and including section N at 150. N as used herein represents an integer corresponding to the number of required sections in the final document 110.

As discussed herein, once a particular document 110, section 120, or module 121 is approved (e.g., through the internal company process or the jurisdictional process) it is stored in module format to allow for granular implementation. This information is used by the technology team to document system requirements for the document creation system as discussed herein to allow for the stored modules 121-123, 131-133, 141-143, 151-153, to be combined to form individual sections, which then form a final document 110. For example, section 1 at 120 may require module 1.1, 1.5, 1.78, 1.88-1.120, and 1.154. Once each required section is composed based on the approved modules. Therefore, it is important not only to store each module with clearly distinguishable characteristics (e.g., name, number, jurisdiction, etc.), but to associate the specific module with the respective section and document.

Figure 2:
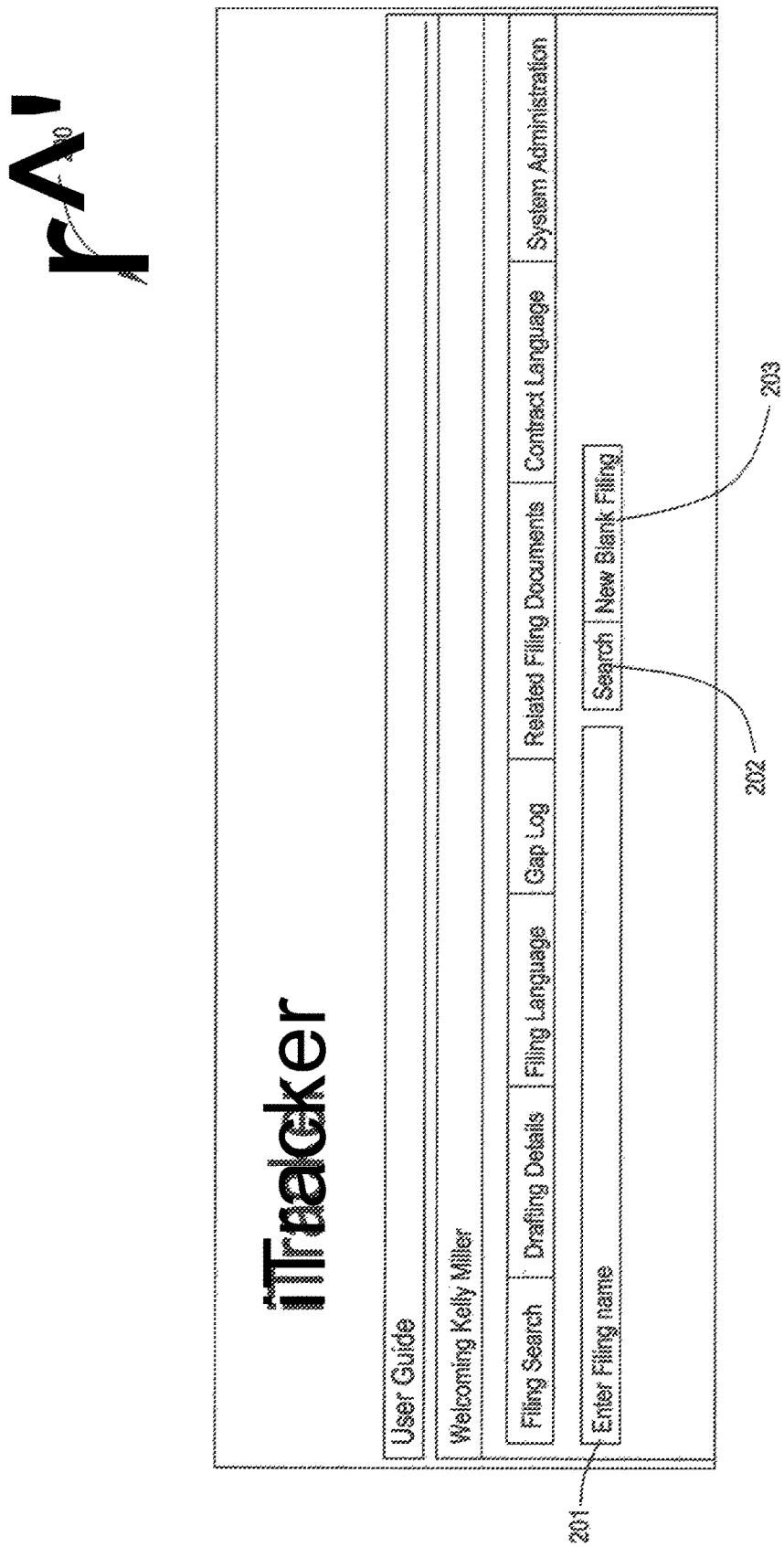
FIG. 2 illustrates an example of creating a new blank filing.

Referring to FIG. 2, an embodiment provides a system for conducting a search of existing filing documents or creation of a new filing at 200. For example, a user enters the name of a desired filing document or module at 201, and clicks the search button at 202. Features regarding the ability to search are discussed in further detail herein, specifically FIG. 10. Alternatively, if a user desires to create a new filing the "new filing" button is selected at 203.

Figure 3:
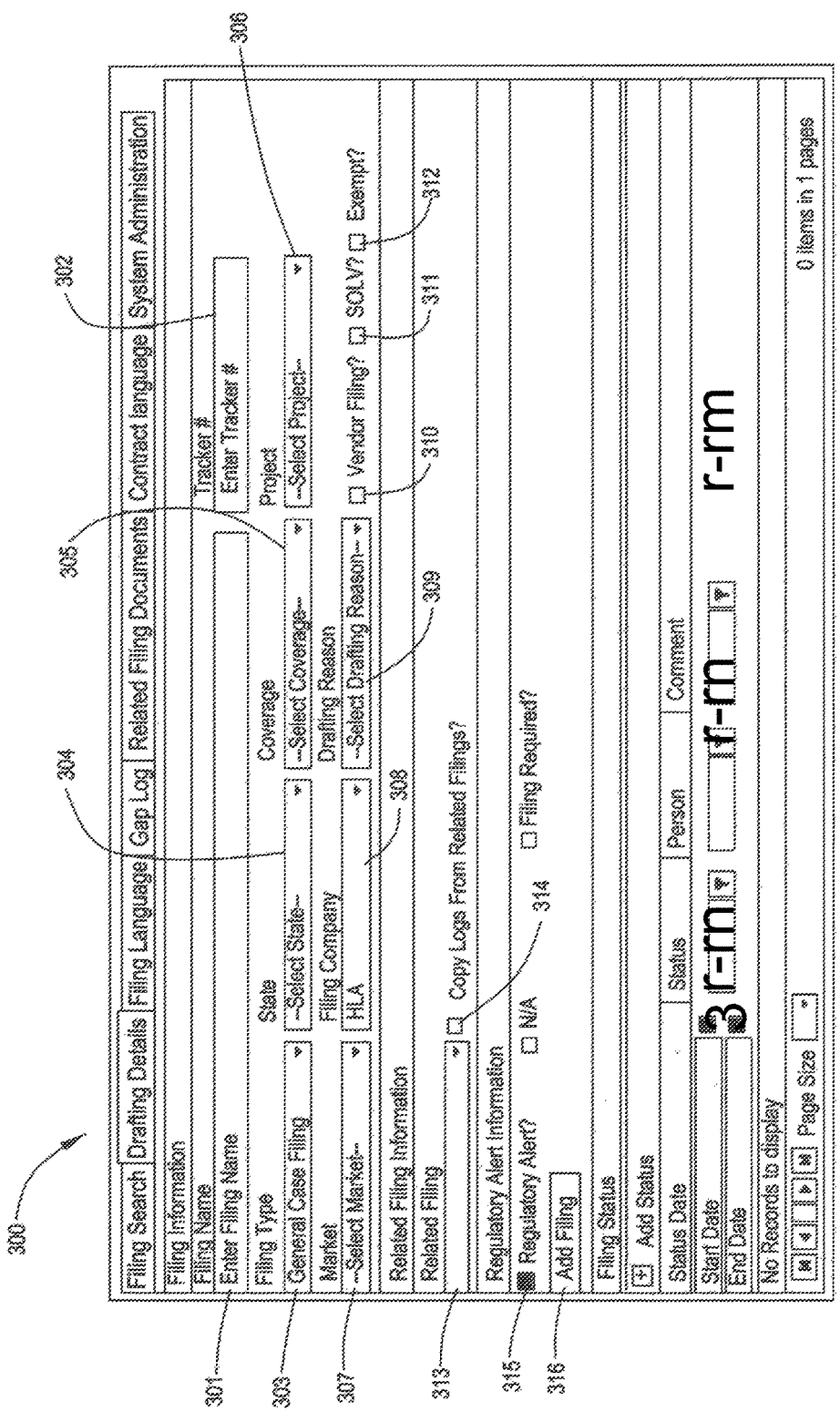
FIG. 3 illustrates an example of generating a filing through data entry.

If the "new filing" button is selected at 203, an embodiment, displays the filing creation page (e.g., the drafting details page at 300 in FIG. 3). Referring now to FIG. 3, once an embodiment is at the filing creation page, the new filing may be named at 301. This naming may allow for easy identification and improves the subsequent search capability. In addition to a name, a tracking number may be entered at 302, a filing type can be selected at 303, and the intended state (e.g., Virginia, Colorado, etc.) of use may be selected at 304. These selections are used to identify the state specific requirements that will affect the final language of the filing. Additionally, the state selection is used for the gap analysis and state specific modifications discussed herein.

An embodiment may also allow for a selection of the coverage type at 305 and a particular project association at 306. In addition to state and jurisdictional restrictions, some modules may be market class specific (e.g., employee, association, etc.) at 307. Additionally, the filing company can be selected at 308 and the reason for drafting at 309. Further beneficial information may be entered such as if a vendor is involved in the filing at 310, is a Statement of Variable Language (SOVL) being filed as part of the new filing at 311, and is the filing exempt at 312. It may also be benefit the tracking and management of the new filing to know if there are any related filings at 313 and if there are related filings the logs should be copied over to the new filing at 314.

Because jurisdictional regulations are constantly in flux, it may be that the new filing is in response to a regulatory alert indicating a recent change in a state's regulatory scheme that needs to be addressed. The new filing can be flagged as being in response to a regulatory alert at 315. Once all of the information is entered, a new filing can be created by clicking the "add filing" button at 316. Thus extensive collection of data is used to enhance the management and tracking capabilities as the prospective filing moves through the system.

Figure 4:
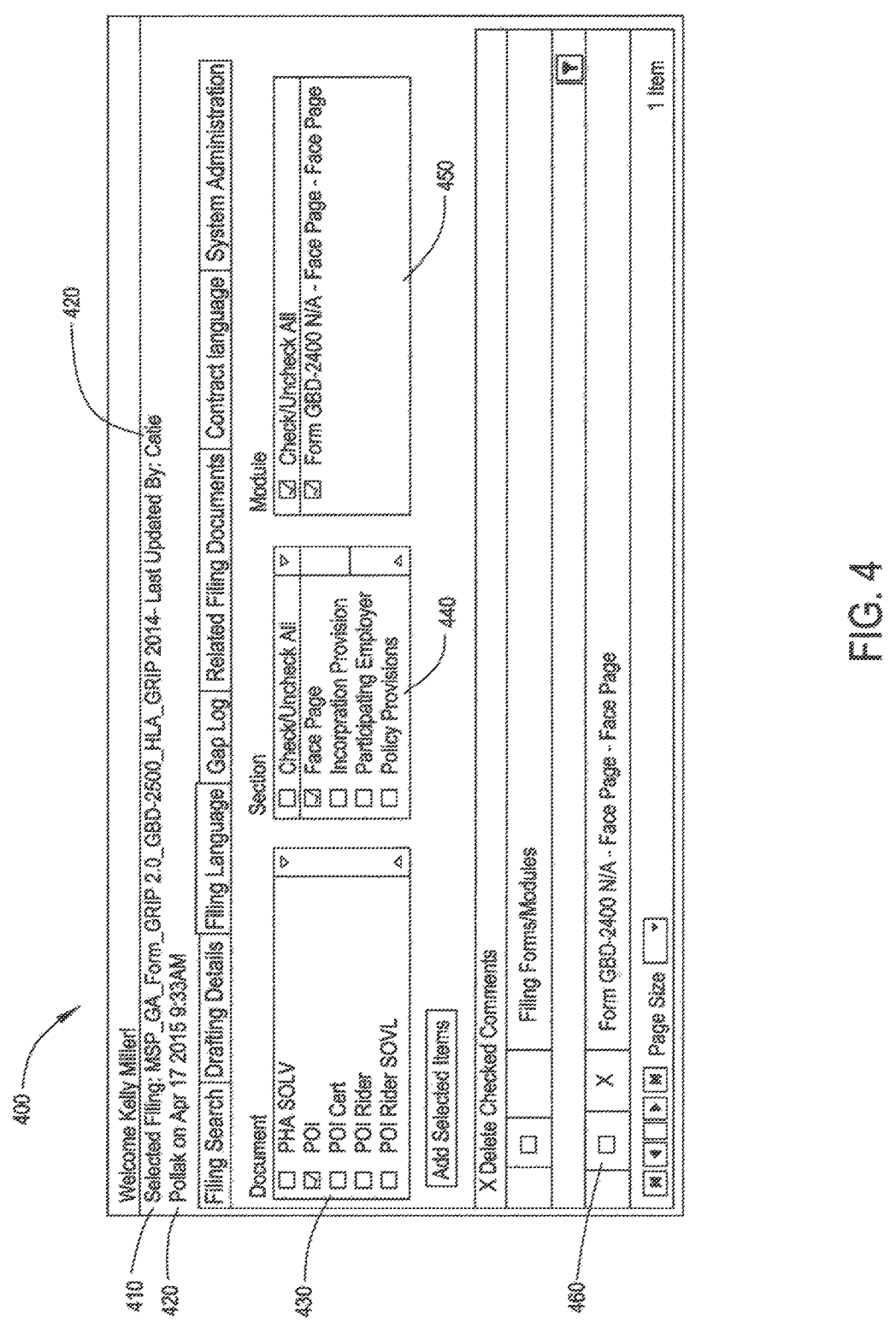

Referring now to FIG. 4, in an embodiment, once a filing is created the modifying and tracking may begin. In order to minimize possible errors, detailed information regarding the filing (e.g., name, market, program, etc) is shown at the top of the display at 410. In addition to this information, an embodiment may also display the date and time of the last revision cycle and the individual that made the revision as shown at 420. This allows for a quick glance review of the filing to ensure that the user has correctly accessed the desired filing, and also informs the user of when the last modification took place, and who it was modified by.

As discussed previously herein, the creation of a document requires that modules be combined into sections and those sections be combined into final documents. Thus, a way to modify, compose, and remove each of these is required. As shown at 400, the user has the option to select which documents 430, sections 440, and modules 450, require modification. In an embodiment, once a user selects a particular document at 430 associated with the filing, a listing of sections is displayed at 440. The selection of a section further narrows the user's desired language to be modified and a list of modules are displayed at 450. The user can then select individual modules to add, modify, or remove based on the document needs at 460. Through this system, each modification can be tracked individually and accorded a time stamp and identify the user implementing the modification.

Thus, if subsequent issues arise, each creation, modification, and deletion action can be tracked to a particular time and a particular user responsible, which may give a better understanding of the process and decision making behind the action. In addition to the details discussed above, a database of gaps is also maintained regarding each filing.

Figure 5A:
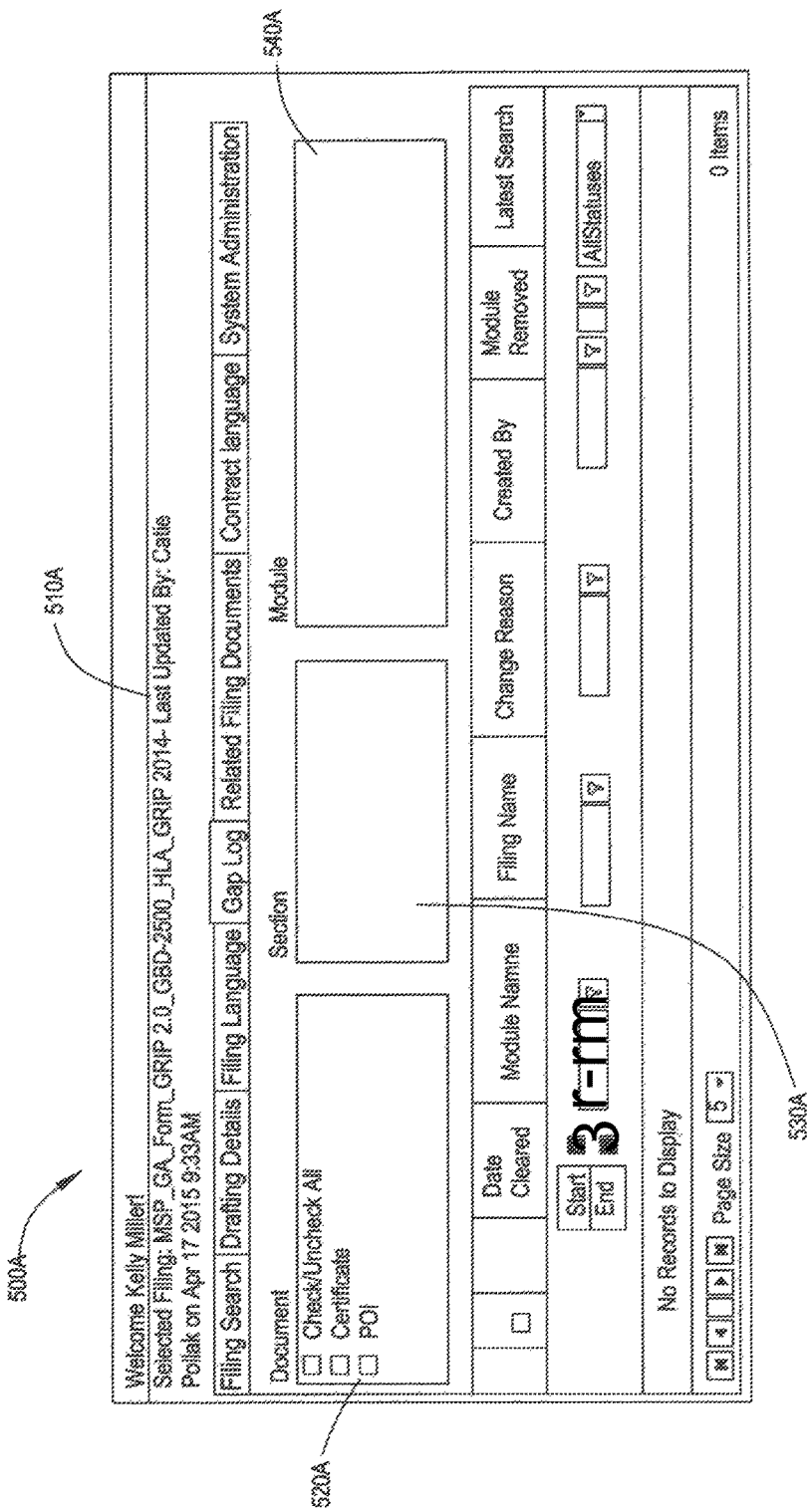
FIG. 5A illustrates an example of modification selection.

Referring now to FIG. 5A, an embodiment tracks the gaps of a filing and allows user modification of those gaps. As discussed in FIG. 4, the detailed information regarding the filing (e.g., name, market, program, etc) is again shown at the top of the display 500A as well as the date, time, and author of the last revision cycle at 510A. FIG. 5A shows the gap log prior to any selection being made. An embodiment may, as shown in FIG. 5A, not show section or module information at 530A and 540A until a document selection is made at 520A.

Figure 6:
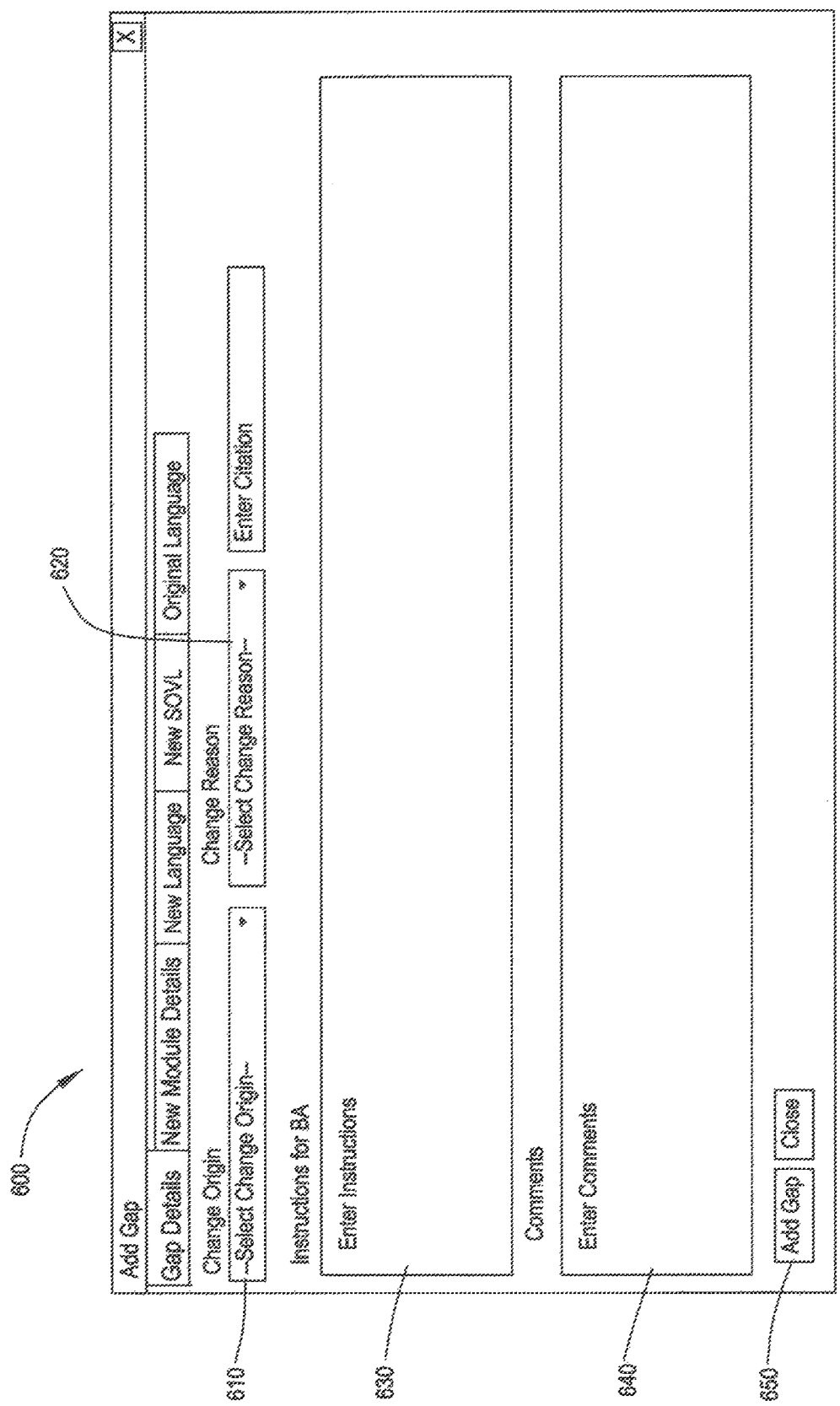
FIG. 6 illustrates an example of gap creations.

Referring now to FIG. 5B, once the desired documents, sections, and modules are selected at 500B (e.g., POI, Face Page, Form GDB-2400 N/A-Face Page-Face Page) additional modification options become available. For example, after a module is selected a gap may be added by selecting "add gap" at 510B. Selecting "add gap" at 510B will open the Gap Details tab as shown in FIG. 6. In addition to adding a gap, a user may send a gap to quality assurance at 520B. In an embodiment, gaps may be quality control checked within the corporation or organization before moving forward in the process (e.g., being sent to a state regulatory agency for approval).

Depending on a user's authorization (e.g., whether they are an administrator, sales, IT, etc.) other options are also available regarding gaps. For example, someone with approval authority (e.g., an attorney for legal contracts) may review the submitted gap language and approve it to progress in the process by clicking "checked gaps QA completed" at 530B. Alternatively, if person with approval authority is unsatisfied, they may select the particular module(s) and click the "checked gaps objected to" at 540B. The gaps that are objected to would then be re-modified and revised again according to the direction of the approving entity.

Referring now to FIG. 6, after as discussed above, "add gap" is selected, the gap details tab is displayed. Various characteristics can be assigned to a gap in the gap details screen at 600. For example, an embodiment, may allow a user to select the gap origin (e.g., regulatory alert, approval objection, statutory or regulatory changes, etc.) at 610.

Additional options are also available, such as defining a change reason at 620 and entering comments or instructions. For example, to assist the Information Technology Business Analysts with determining requirements at 630 and to help users understand the reason for the gap change at 640. Once the all the relevant details are entered for tracking purposes, a gap can be added at 650.

Figure 7:
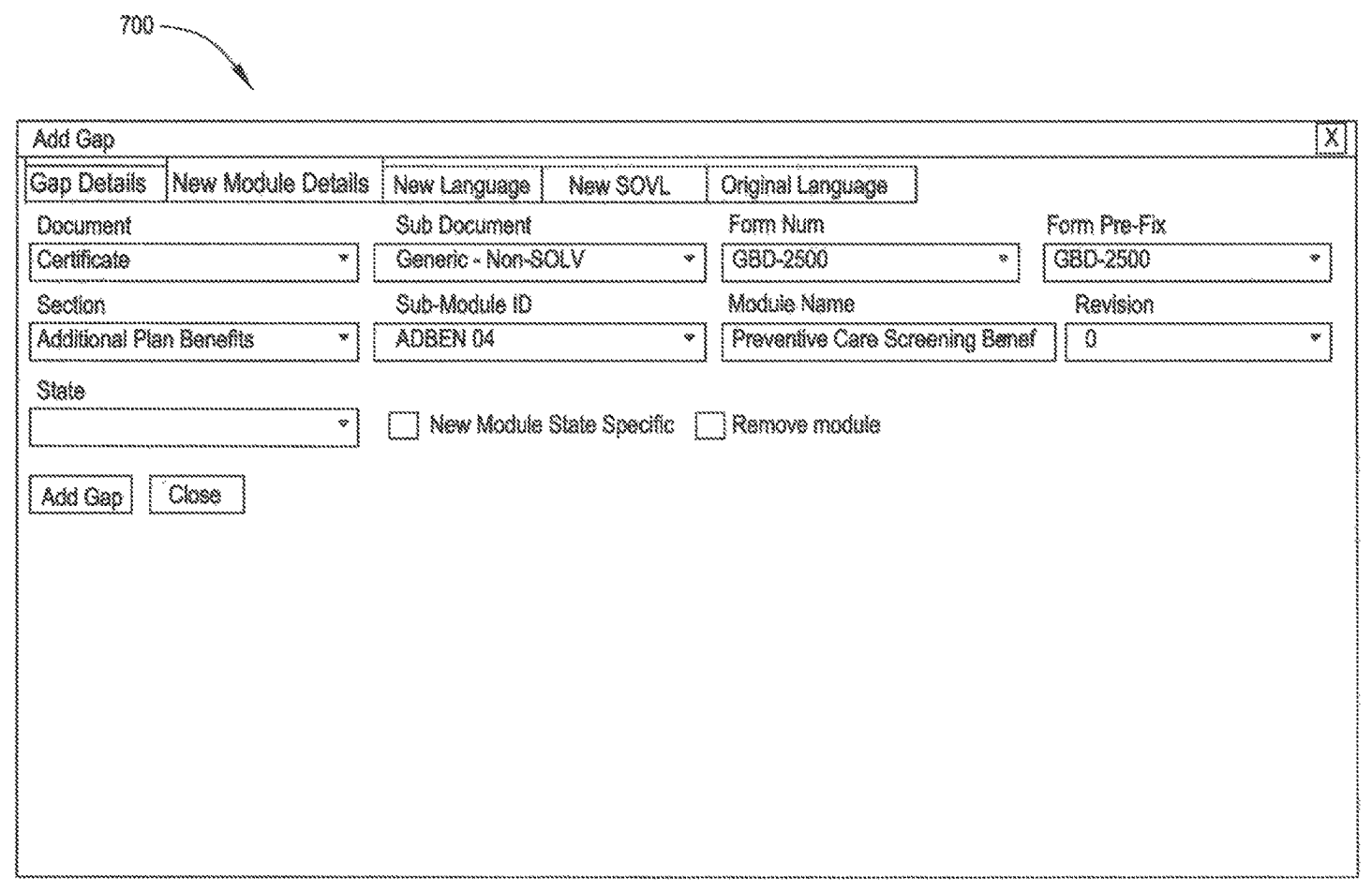

Referring now to FIG. 7, once a gap has been created as described in FIG. 6, module information must be defined for the gap. Based on the selections made during the gap log process (e.g., FIGS. 5A and 5B), various elements within the "new modules details" tab may be prefilled at 700. In an embodiment, the pre-filled selections can be modified by a user if required via a drop down or data entry box.

Figure 8:
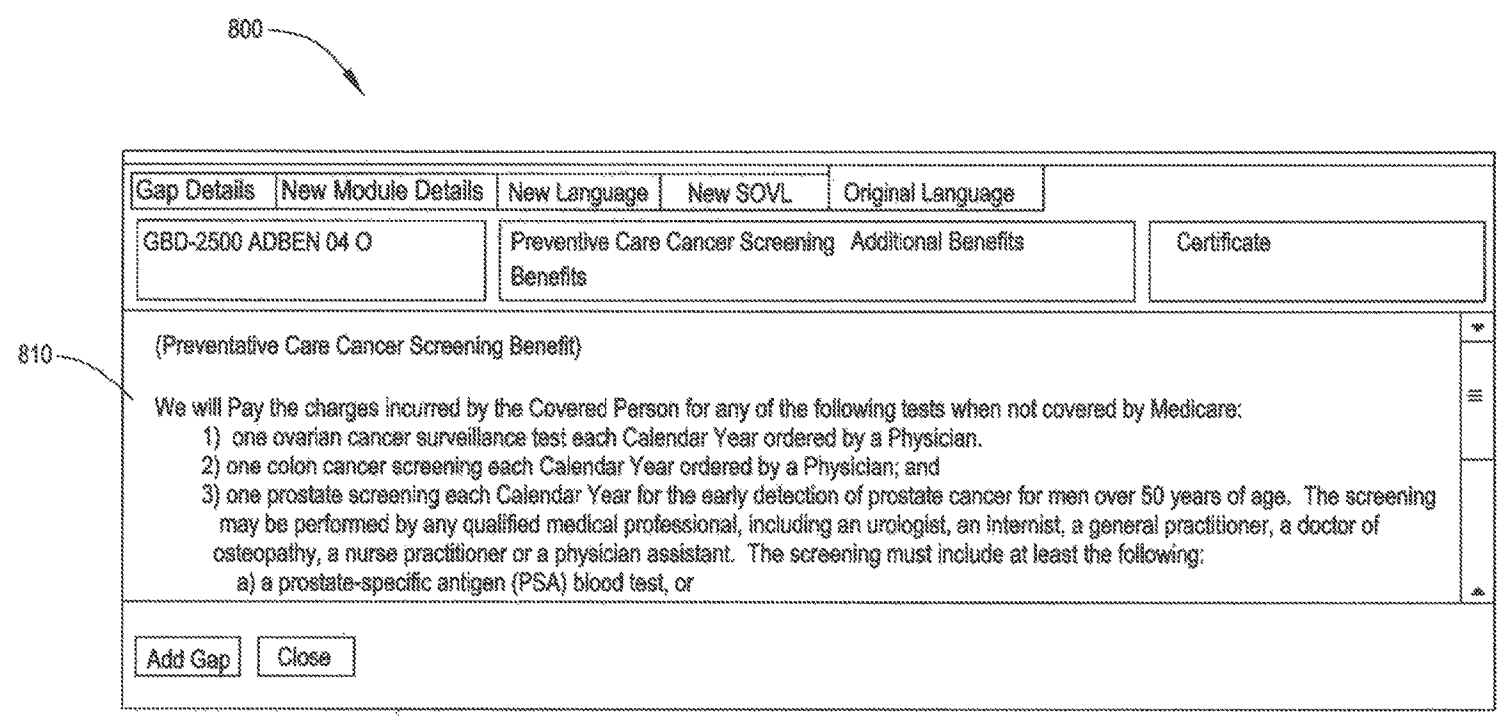

Referring now to FIG. 8 and FIG. 9, in an embodiment, once a gap is created, a user can view the original language at 800. The original or generic module language which is stored in the database is automatically pre-filled due to the previous modules selection at 810. In an embodiment, when it is determined that a gap exists, and thus a modification is required, a new language display at 900 is used to modify the language. In an embodiment, a user may enter red-lined text into the change description data field at 910. This allow for easier recognition of the gapping update at a later time. Additionally, a user may enter a clean copy of the updated module language once the change is implemented at 920.

In an embodiment, if it is determined that the requested change is part of the SOVL of all of the states' insurance contract documents using the affected generic section or module, then the new SOVL tab is selected at 940. The new SOVL tab is similar to the new language tab in that it has a change description 910 and clean language 920 data field. A SOVL is a document which typically lists variable text that has been approved by a regulator. A non-limiting example of variable text is the use of the term employee, associate and colleague to refer to someone who would commonly be called an employee.

Figures 10A, 10B:
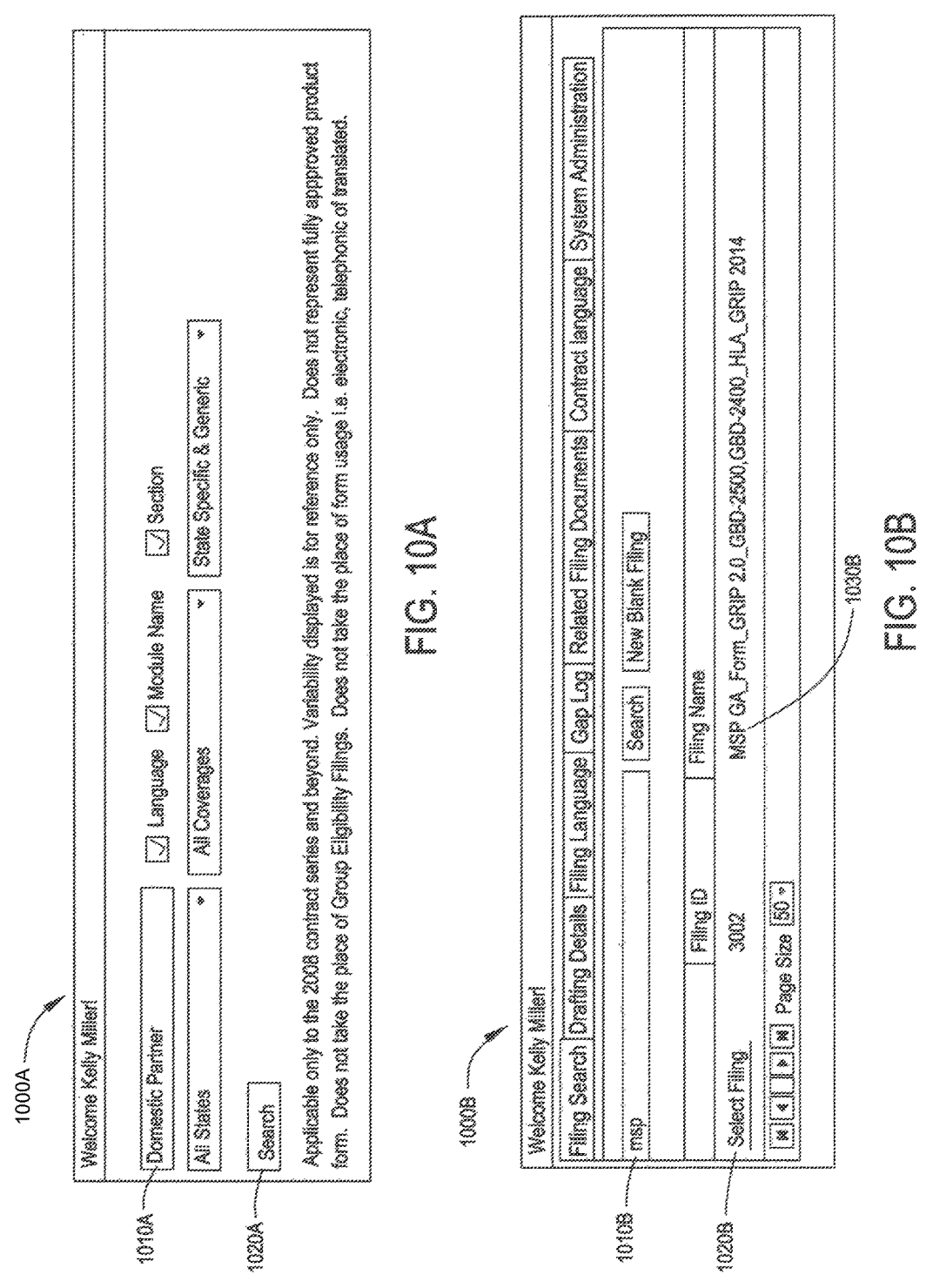

Referring now to FIGS. 10A and 10B, in an embodiment, a filing search can be conducted at 1000A. For example, a member of the product delivery team could access the centralized database via a web portal and enter a term or phrase to be searched at 1010B. The user may then press the search button at 1020B to conduct a search of the database. An embodiment returns possible matches for the user to view in 1000B. In the present example, the user searched for "msp" as shown at 1010B. This search resulted in retrieval of a filing with a related title at 1020B. Once the search results are returned, a selection can be made based on the desired filing (e.g., clicking "select filing" at 1030B). Once the filing is selected, the drafting details tab (similar to that shown in FIG. 3 is opened and the filing information is pre-filled.

Figure 11:
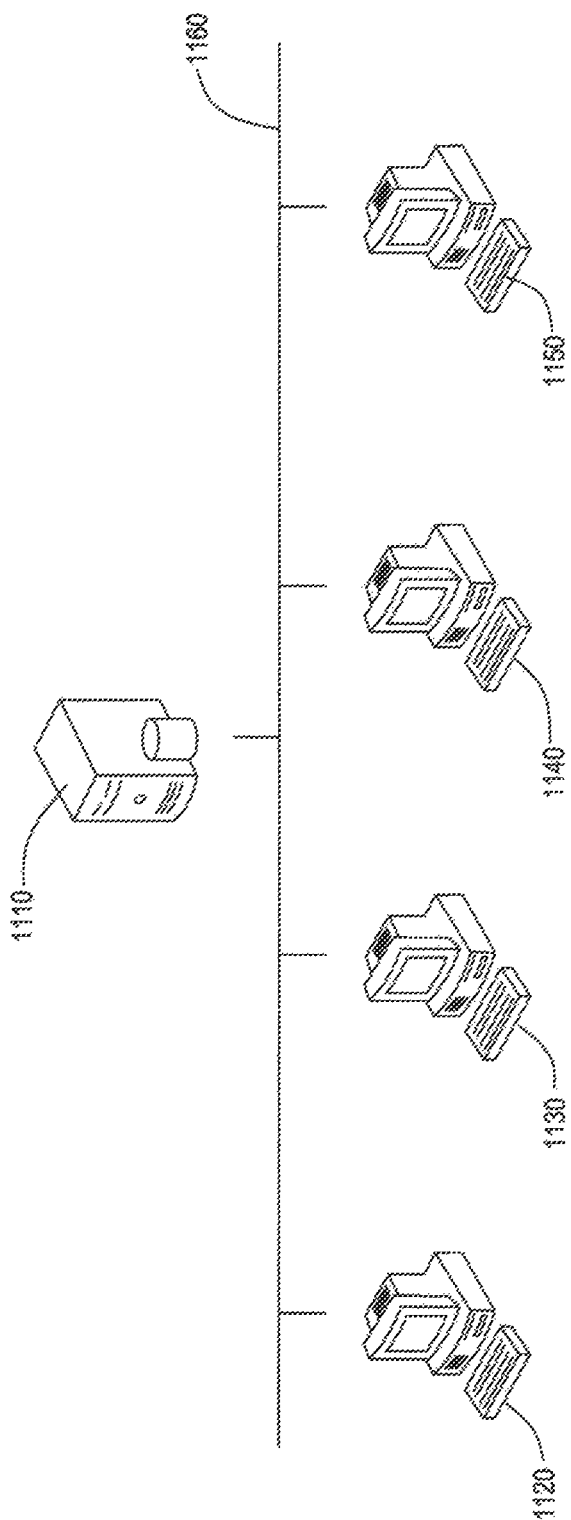
FIG. 11 illustrates an example of end user access to the module database.

Once the gaps have been addressed (e.g., the modules have been updated and approved) an embodiment stores the modules in a database server such as that shown at 1110 in FIG. 11 and discussed herein. This database server can be maintained independently by a third party (e.g., cloud server service) or stored and maintained in house. Although a single system is shown, it is intended as a non-limiting example of possible implementations. Those skilled in the art will recognize that multiple databases on multiple systems may be utilized to house the plurality of modules. For example, in an embodiment, the systems may breakdown along categorical lines (e.g., by jurisdiction, module type, etc.).

Figure 12:
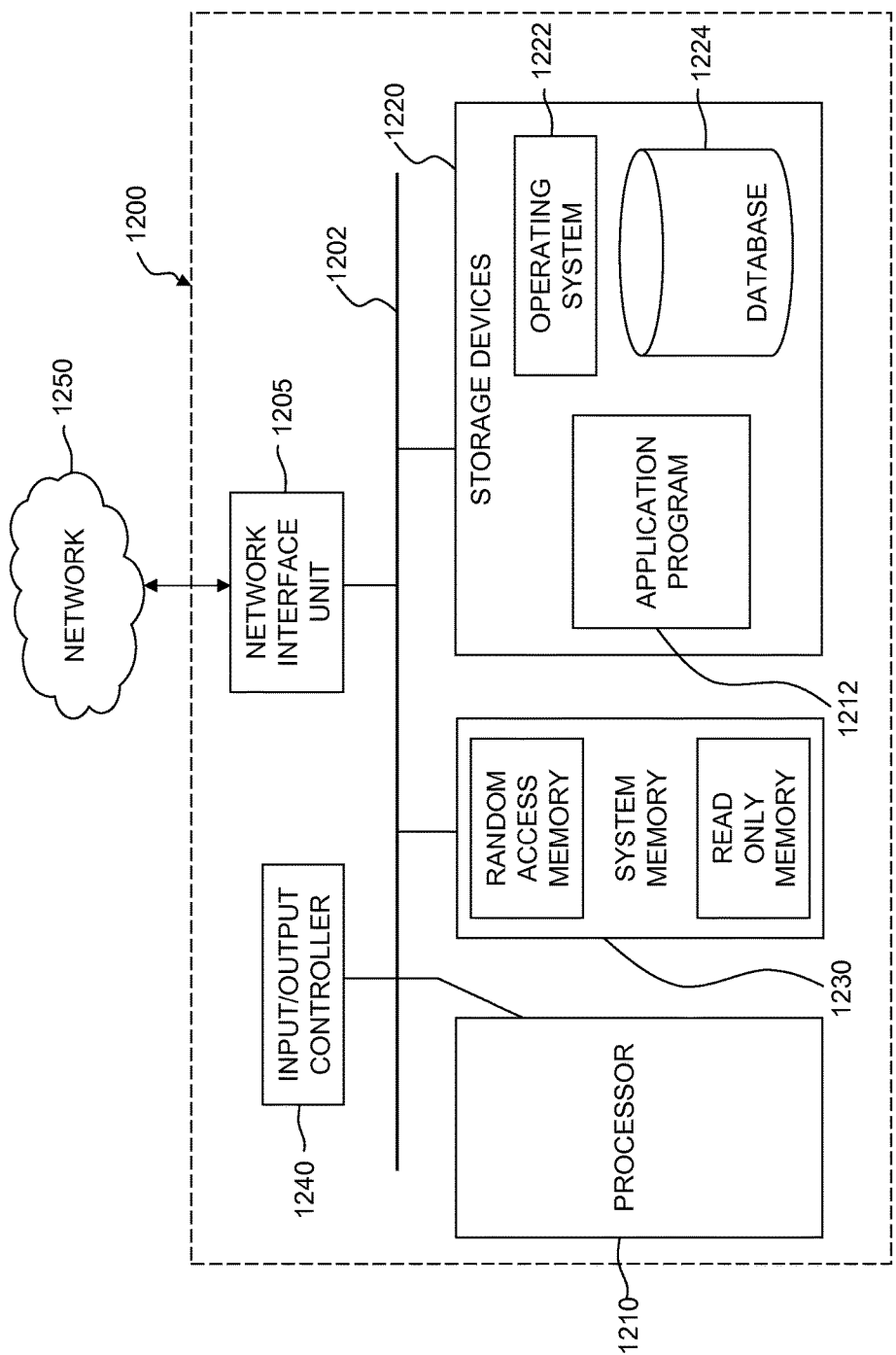
FIG. 12 illustrates an example system for utilizing a graphical user interface for tracking data access and data changes in a centralized database.

In an embodiment, the database is connected to a network using a network connection device such as, for example,

1205 of FIG. 12. The connection device may connect to a local area network (LAN) or a wide area network (WAN) at 1160. This allows multiple end users at 1120-1150, to access the module database, make module selections, and update the modules. By way of specific example, an end user 1120-1150 may operate his or her system to compile and send data relating to a plurality of parameters, e.g., state or other jurisdictional information, data relating to the type of coverage(s) needed, and the like. The end user systems 1120-1150 may send this data via a network, e.g., network 1160, such that it is received by a database server that stores modules, e.g., database server 1110. Database server 1110, for its part, receives the data parameters sent by an end user system, e.g., 1120, and processes the data parameters to identify specific modules that are requested. The database server 1110 then may export these modules to the requesting end user system, e.g., 1120. The database server 110 moreover may compile the modules, e.g., into a partially complete or complete document, according to the data parameters received, prior to transmitting the same over the network, e.g., 1160, to the requesting client system, e.g., 1120.

Additionally or alternatively, a secondary system (e.g., a document creation application server) may access the database and create the documents. The secondary system may then pass the completed documents to the end user systems 1120-1150 for distribution a product delivery team or equivalent. In an embodiment, this secondary system may be a stand alone application, or alternatively built into the document repository for ease in document creation.

The graphical user interface for tracking data access and data changes in a centralized database may be implemented in an automated or semi automated system using appropriate circuitry and components programmed according to the various embodiments. While various other circuits, circuitry or components may be utilized in computing devices utilized for such special purposes, an example illustrated in FIG. 12 includes a system design found for example in laptop, desktop or other computing platforms. Such circuitry 1200 may be used in a device that implements a high availability scoring methodology, portfolio prioritization and testing process, as described herein, such as a computing device of an insurance carrier used for enterprise application portfolio management.

In the example of FIG. 12, a storage device 1220 includes software such as a module management system program 1212 that may be run or executed by processor(s) 1210 according to an operating system 1222. The circuitry 1200 provides that the processor loads the operating system 1222 and thereafter the application program 1210, e.g., into memory 1230.

System 1200 typically includes a network interface 1205 facilitating communications with other devices, e.g., a connection to other devices over a network 1250 using components such as a WWAN transceiver, a WLAN transceiver or a wired connection, e.g., a LAN connection. Commonly, system 1200 will include an input/output controller 1240 for data input and display. System 1200 typically includes various memory 1230 and storage devices 1220, for example a database 1224, e.g., for storing modules and gap data, referred to herein.

Device circuitry, as for example outlined in FIG. 12, may be used by insurance carriers for tracking data access and data changes in a centralized database. It will also be apparent that circuitry other than the non-limiting example outlined in FIG. 12 may be used.

Figure 13:
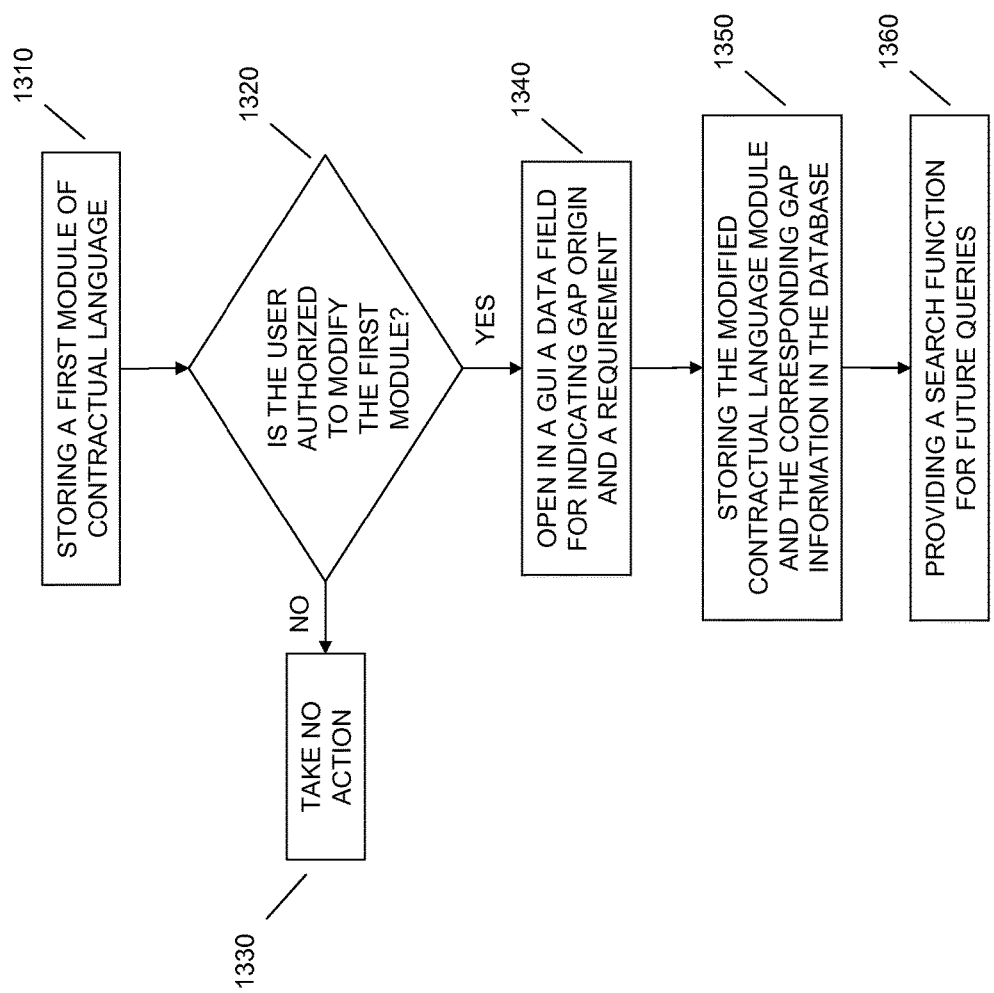
FIG. 13 illustrates an example method of utilizing a graphical user interface for tracking data access and data changes in a centralized database.

By way of example, FIG. 13 illustrates an example method of a graphical user interface for tracking data access and data changes in a centralized database. In an embodiment, a first module is stored in a database at 1310. This generic contractual language may later be used as a template for the gapping process that facilitates the creation of state specific modules. In order for the modification to take place, a user is authenticated via credentials at 1320. The user is then granted access to all of or a sub-portion of the data base. In addition, the user's editing rights may be limited by their authentication. For example, an administrator may have full read/write access, while a product delivery manager may only be able to view the modules. If the user is not authorized to access the database, then no action is taken at 1330.

Alternatively, if the user is authorized to access at least a sub-portion of the database, they are directed to the GUI discussed at length herein at 1340. Using this GUI, a user can indicate a gap origin (e.g., based on the laws and regulations of the specific jurisdiction) and specify the requirements of the gapping process at 1340. This can include selecting a module to be gapped. Based on these specifications, the language module will go through an iterative process where multiple people may modify, review, and approve the module for use in a filing. In order to facilitate this process, the modified module (e.g., state specific contract language) is stored in a database along with the corresponding gap information at 1350.

Finally, once the module is modified and approved for filing it is then able to be listed in a searchable database. In addition to the modified language, the records of the life-cycle of the module from creation to approval are associated and stored. Thus, a user can search through the entire repository of modules at 1360. In an embodiment, the search can be conducted based on a variety of factors (e.g., keyword, module number, module name, etc.).

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A system having a graphical user interface for tracking data access and data changes in a centralized database, comprising:
    a database storing a first language module corresponding to a portion of a document;
    a display providing a graphical user interface that permits access to an authorized user for modifying the first language module and for selecting an intended state of use of the first language module;
    the graphical user interface enabling user interaction with an icon for indicating a gap for the first module in response to selection of the document, a section of the document, and the first language modules, wherein the gap is determined based on the laws and regulations of the selected intended state of use, wherein the gap identifies a difference between requirements included in the first language module and requirements of the selected intended state of use of the first language module;
    a processor that, responsive to the user interaction with the icon, opens in the graphical user interface, at least one data field for indicating gap origin, reason for the gap change, and at least one gap requirement based upon the identified difference;
    the graphical user interface providing a function for associating the gap with the first module and generate a modified module comprising the first language module modified by incorporating the information related to the gap identified in the at least one data field;
    a processor that stores in the database the first module, the gap, and the modified module; and
    the graphical user interface providing a search function to an authorized user for retrieving one or more of the first module and the modified module.

2. The system of claim 1, wherein the gap is determined based on the laws and regulations of specific jurisdictions.

3. The system of claim 1, wherein the search function searches the modules based on at least one of: keyword, module number, and module name.

4. The system of claim 1, wherein the graphical user interface includes elements for selecting the modules to be gapped.

5. The system of claim 1, further comprising a processor that pre-fills the at least one data field based on the indicated gap for the first module;
    wherein the at least one data field is pre-filled with the first module language.

6. The system of claim 1, wherein the graphical user interface displays a status of the gap.

7. The system of claim 1, wherein the graphical user interface includes a gap release icon to release an approved gap as a modified module.

8. The system of claim 1, wherein the authorization of the user has a plurality of access levels, the levels granting different amounts of access to the database.

9. An apparatus providing a graphical user interface for tracking data access and data changes in a centralized database, comprising:
    a processor; and
    a non-transitory computer readable storage medium having computer readable program code embodied therewith and executable by the processor, the computer readable program code comprising code configured to:
    access a database storing a first language module corresponding to a portion of a document;
    provide a display providing a graphical user interface that permits access to an authorized user for modifying the first language module, wherein the authorization of the user has a plurality of access levels, the levels granting different amounts of access to the database and wherein the graphic user interface permits and selection of an intended state of use of the first language module;
    the graphical user interface enabling user interaction with an icon for indicating a gap for the first module in response to selection of the document, a section of the document, and the first language modules, wherein the gap is determined based on the laws and regulations of the selected intended state of use, wherein the gap identifies a difference between requirements included in the first language module and requirements of the selected intended state of use of the first language module;
    the processor, responsive to user interaction with the icon, opening in the graphical user interface, at least one data field for indicating gap origin, reason for the gap change, and at least one gap requirement based upon the identified difference;
    the graphical user interface providing a function for associating the gap with the first module and generate a modified module comprising the first language module modified by incorporating the information related to the gap identified in the at least one data field; and the processor storing in the database the first module, the gap, and the modified module;

the graphical user interface providing a search function to an authorized user for retrieving one or more of the first module and the modified module.

10. The apparatus of claim 9, wherein the search function searches the modules based on at least one of: keyword, module number, and module name.

11. The apparatus of claim 9, wherein the graphical user interface includes elements for selecting the modules to be gapped.

12. The apparatus of claim 9, further comprising a processor that pre-fills the at least one data field based on the indicated gap for the first module;

wherein the at least one data field is pre-filled with the first module language.

13. The apparatus of claim 9, wherein the graphical user interface displays a status of the gap.

14. The apparatus of claim 9, wherein the graphical user interface includes a gap release icon to release an approved gap as a modified module.

15. A computerized method for using a graphical user interface for tracking data access and data changes in a centralized database, comprising:

storing, in a database, a first language module corresponding to a portion of a document;

providing, on a display device, a graphical user interface that permits access to an authorized user for modifying the first language module and for selecting an intended state of use of the first language module;

the graphical user interface enabling user interaction with an icon for indicating a gap for the first module in response to selection of the document, a section of the document, and the first language modules, wherein the gap is determined based on the laws and regulations of the selected intended state of use, wherein the gap identifies a difference between requirements included in the first language module and requirements of the selected intended state of use of the first language module;

opening, responsive to the user interaction with the icon, the graphical user interface, at least one data field for indicating gap origin, reason for the gap change, and at least one gap requirement based upon the identified difference;

the graphical user interface providing a function for associating the gap with the first module and generating a modified module comprising the first language module modified by incorporating the information related to the gap identified in the at least one data field; and storing, in a database, the first module, the gap, and the modified module;

the graphical user interface providing a search function to an authorized user for retrieving one or more of the first module and the modified module.

16. The method of claim 15, wherein the gap is determined based on the laws and regulations of specific jurisdictions.

17. The method of claim 15, wherein the search function searches the modules based on at least one of: keyword, module number, and module name.

18. The method of claim 15, further comprising pre-filling the at least one data field based on the indicated gap for the first module;

wherein the at least one data field is pre-filled with the first module language.

19. The method of claim 15, wherein the graphical user interface displays a status of the gap.

20. The method of claim 15, wherein the authorization of the user as a plurality of access levels, the levels granting different amounts of access to the database.

* * * * *